(12) United States Patent
Wang

(10) Patent No.: US 10,408,354 B2
(45) Date of Patent: Sep. 10, 2019

(54) AIR VALVE CONNECTING DEVICE HAVING PIVOTAL ACTUATING KNOB

(71) Applicant: Beto Engineering & Marketing Co., Ltd., Taichung (TW)

(72) Inventor: Lo Pin Wang, Taichung (TW)

(73) Assignee: BETO ENGINEERING & MARKETING CO, LTD., Taichung (TW)

( * ) Notice: Subject to any disclaimer, the term of this patent is extended or adjusted under 35 U.S.C. 154(b) by 0 days.

(21) Appl. No.: 15/202,621

(22) Filed: Jul. 6, 2016

(65) Prior Publication Data

US 2018/0010695 A1    Jan. 11, 2018

(51) Int. Cl.
*F16K 1/30* (2006.01)
*F04B 33/00* (2006.01)

(52) U.S. Cl.
CPC .............. *F16K 1/308* (2013.01); *F04B 33/00* (2013.01); *F04B 33/005* (2013.01)

(58) Field of Classification Search
CPC  F16K 1/308; F16L 37/02; F16L 55/07; Y10T 137/3584; Y10T 137/3724
USPC ............ 285/84–85, 374–375, 399–400, 403
See application file for complete search history.

(56) References Cited

U.S. PATENT DOCUMENTS

| | | |
|---|---|---|
| 5,960,815 A | 10/1999 | Wang |
| 6,105,600 A | 8/2000 | Wang |
| 6,105,601 A | 8/2000 | Wang |
| 6,328,057 B1 | 12/2001 | Wang |
| 7,866,335 B2 | 1/2011 | Wang |
| 8,539,971 B2 | 9/2013 | Wang |
| 2008/0236675 A1* | 10/2008 | Wang ................ F16K 15/20 137/231 |
| 2009/0229677 A1* | 9/2009 | Wang ................ F04B 33/005 137/231 |
| 2010/0116353 A1* | 5/2010 | Wang ................ F16K 15/20 137/223 |
| 2014/0190576 A1* | 7/2014 | Wang ................ F16K 15/20 137/231 |

* cited by examiner

*Primary Examiner* — Anna M Momper
*Assistant Examiner* — Fannie C Kee
(74) *Attorney, Agent, or Firm* — Che-Yang Chen; Law Offices of Scott Warmuth

(57) ABSTRACT

An air valve connecting device includes a housing, a sliding member, a gasket, a follower and an actuating knob. The sliding member is slidably engaged in the housing and has a pathway selectively aligning with a passage of the housing. The gasket is attached to the sliding member for engaging with an inflation valve. The follower is slidably engaged in the sliding member for engaging with the inflation valve. The actuating knob is rotatably attached to the sliding member. The actuating knob is rotatable relative to the sliding member to an angular position where the follower is anchored to the sliding member and to another angular position where the follower is released from the sliding member.

10 Claims, 5 Drawing Sheets

AIR VALVE CONNECTING DEVICE HAVING PIVOTAL ACTUATING KNOB

BACKGROUND OF THE INVENTION

1. Field of the Invention

The present invention relates to an air valve connecting head or device, and more particularly to an air valve connecting device having pivotal actuating knob, which includes a simplified and improved structure for easily connecting to various inflation valves and for being easily actuated and operated with a single hand of the user and for being easily manufactured with a decreased manufacturing cost.

2. Description of the Prior Art

Typical air valve connecting devices comprise a valve housing with one end for connecting or coupling to a pressurized air reservoir and for receiving the pressurized air from the pressurized air reservoir, and with the other end as a fitting port for receiving or engaging with an inflation valve and for inflating the balls, the inner tires of the bicycles or the motorcycles or the vehicles.

The present inventor has developed a variety of air valve connecting devices. For example, U.S. Pat. Nos. 5,960,815, 6,105,600, 6,105,601, 6,328,057, 7,866,335, and 8,539,971 of Wang respectively disclose several typical air valve connecting heads for a hand-held air pump comprising a valve housing with one end for connecting or coupling to a pressurized air reservoir and with a fitting port formed in an elastic annular block for engaging with an inflation valve.

However, when users operate the aforesaid conventional air valve connecting devices, they usually need one hand to grasp or hold or operate an actuating handle or hand grip and the other hand to grasp and actuate the valve housing, therefore, the conventional air valve connecting devices may not be easily operated or effectively grasped or held for the different inflation valves.

The present invention aims to mitigate and/or obviate the afore-described disadvantages of the conventional air valve connecting devices.

SUMMARY OF THE INVENTION

The primary objective of the present invention is to provide an air valve connecting device including a simplified or improved structure for easily connecting to various inflation valves and for being easily actuated or operated with a single hand of the user and for being easily manufactured with a decreased manufacturing cost.

In accordance with one aspect of the invention, there is provided an air valve connecting device comprising a housing including a chamber formed therein and having a first end portion and a second end portion, the housing includes a passage formed therein for communicating with the chamber of the housing, a sliding member is slidably engaged in the chamber of the housing having a compartment and a pathway formed therein for communicating with the passage of the housing and for allowing an air from the passage and the chamber of the housing to flow from the pathway to the compartment of the sliding member, a gasket is attached to the sliding member having a bore formed therein for communicating with the compartment of the sliding member and for selectively engaging with an inflation valve, a follower is slidably engaged in the compartment of the sliding member and engageable into the bore of the gasket for selectively engaging with the inflation valve, and an actuating knob is rotatably attached to the sliding member and is rotatable relative to the housing and the sliding member to a first angular position where the follower is anchored to the sliding member and to a second angular position where the follower is released from the sliding member for allowing the air valve connecting device to be easily and quickly engaged with either of the inflation valves by rotating the actuating knob relative to the sliding member.

The follower includes a flap extended therefrom, and the actuating knob includes at least one anchor extended therefrom for selectively engaging with the follower and for anchoring the follower to the sliding member, and the actuating knob includes at least one groove formed therein for selectively aligning with the follower and for allowing the follower to be moved along the groove of the actuating knob.

The actuating knob includes a tubular member extended therefrom, and includes a cavity formed in the tubular member, and the groove is formed in the tubular member for forming the anchor in the tubular member. The actuating knob includes a spring biasing member engaged in the tubular member and engaged with the follower for biasing and positioning the follower to the sliding member.

The housing includes two symbols provided on top thereof, and the actuating knob includes a notch formed therein for selectively aligning with either of the symbols of the housing and for allowing either of the symbols to be selectively seen through the notch of the actuating knob and for indicating whether the follower is anchored or positioned to the sliding member or not.

The sliding member includes an inner peripheral depression formed therein, and the actuating knob includes a peripheral rib extended therefrom to be slidably engaged with the inner peripheral depression of the sliding member for allowing the actuating knob to be rotated relative to the sliding member and for preventing the actuating knob from moving up and down relative to the sliding member.

The housing includes a guide slot formed therein, and the sliding member includes a peg extended therefrom to be slidably engaged with the guide slot of the housing for guiding the sliding member to slide longitudinally relative to the housing and for preventing the sliding member from being rotated relative to the housing.

The sliding member includes a peripheral swelling extended radially and inwardly into the compartment of the sliding member for forming a space with an inner diameter smaller than that of the compartment and communicating with the compartment in the sliding member.

A grasping device may further be provided a plurality of pawls engaged with the gasket, each of the pawls includes a lower portion extendible out of the first end portion of the housing. The housing includes a cover attached to the first end portion of the housing, the cover includes a space formed therein and a peripheral projection extended radially and inwardly into the space of the cover, the peripheral projection of the cover is engageable with the pawls for selectively forcing the pawls radially inward and toward each other and for compressing the gasket to engage with the inflation valve.

Further objectives and advantages of the present invention will become apparent from a careful reading of the detailed description provided hereinbelow with appropriate reference to the accompanying drawings.

DETAILED DESCRIPTION OF THE PREFERRED EMBODIMENT

Figure 1:
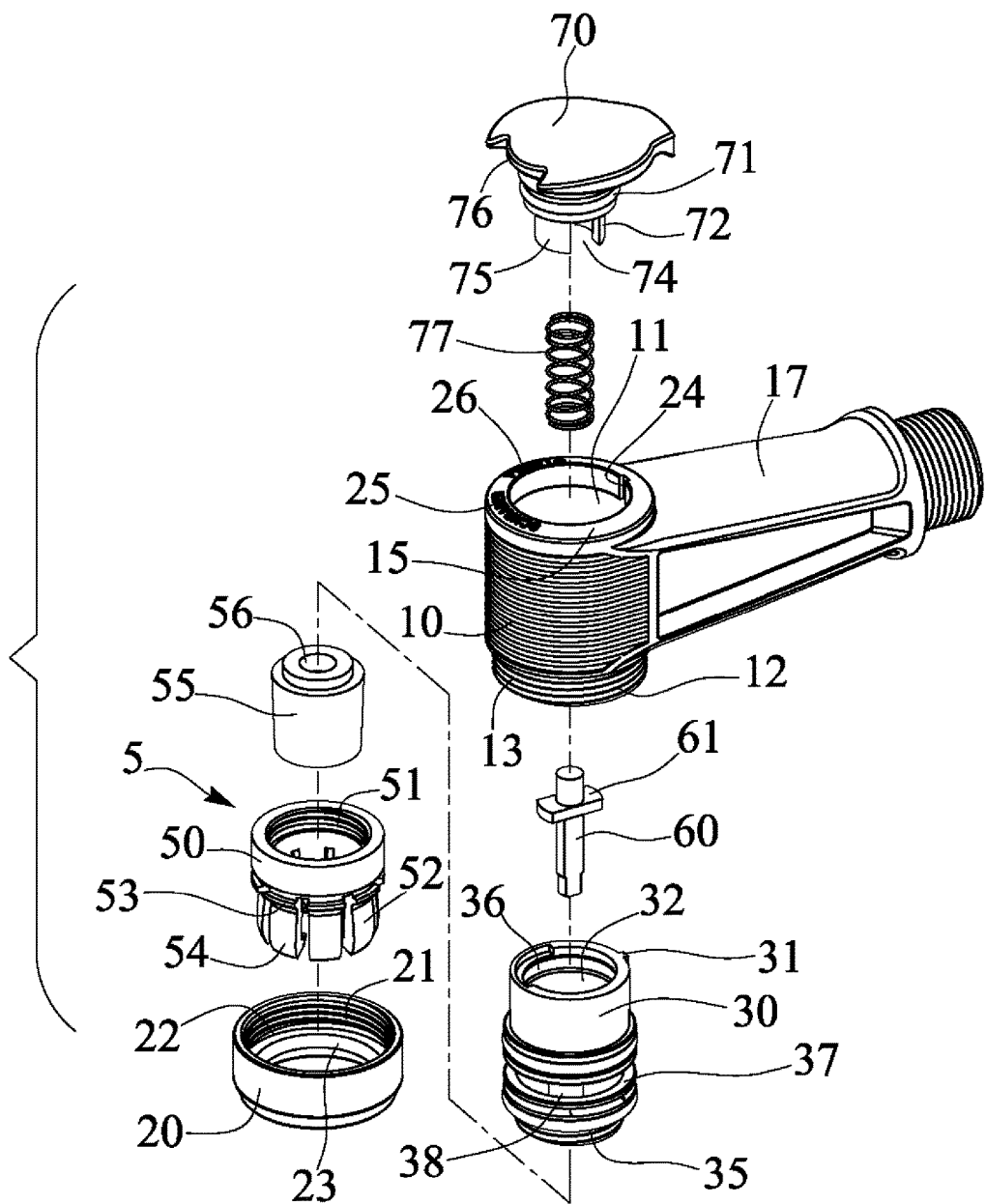
FIG. 1 is a partial exploded view of an air valve connecting device in accordance with the present invention.
Figure 2:
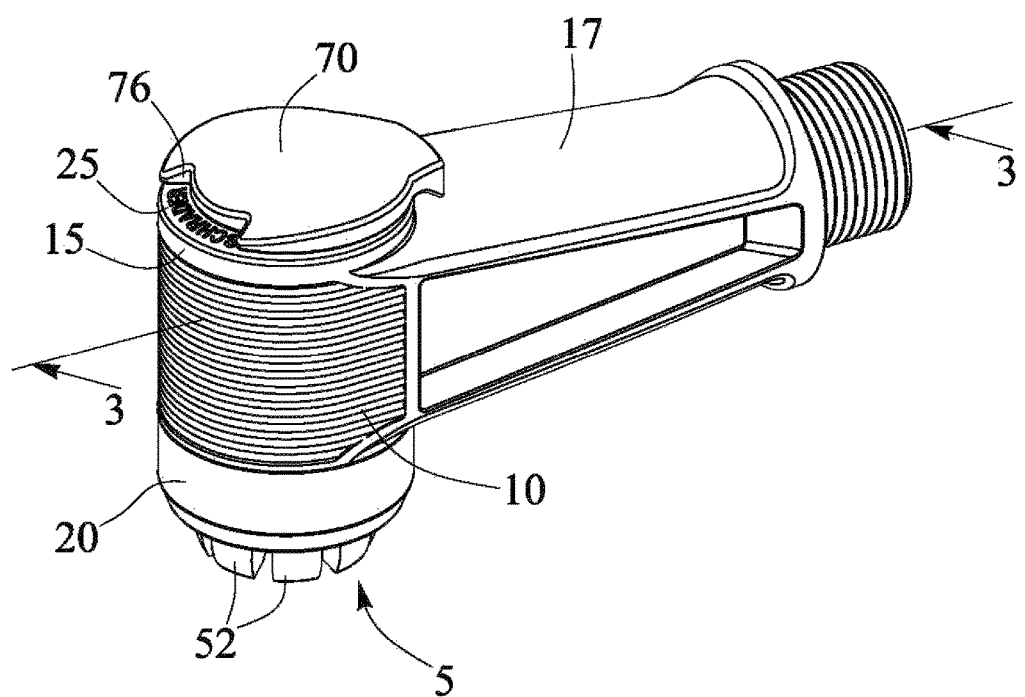
FIG. 2 is a perspective view of the air valve connecting device.
Figure 3:
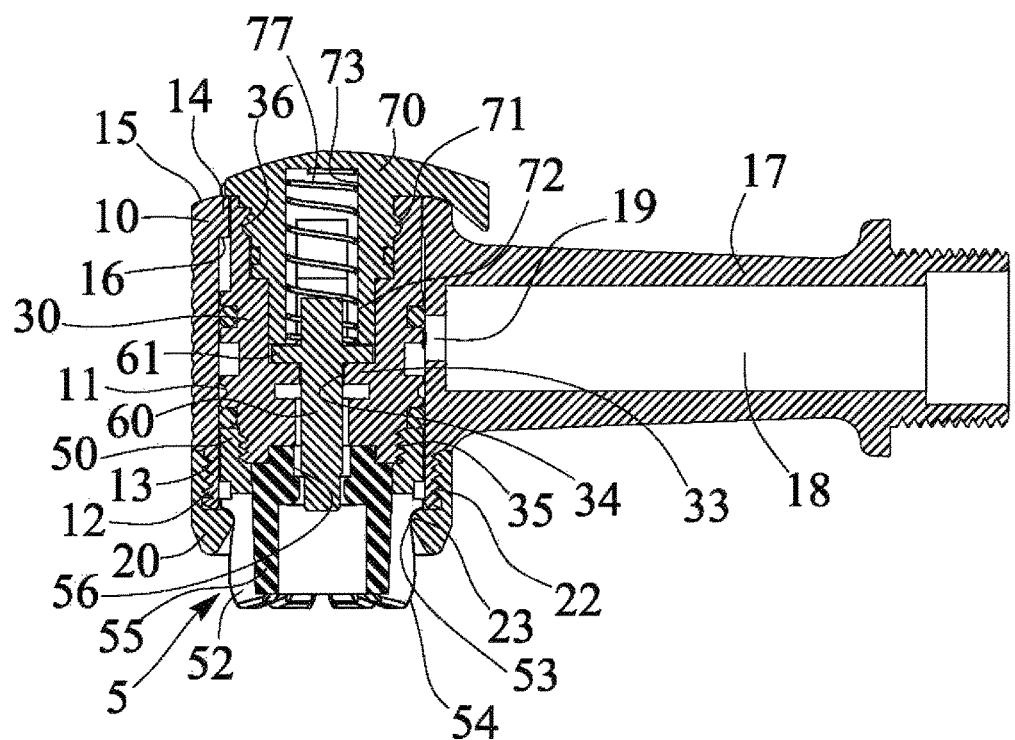
FIG. 3 is cross sectional view of the air valve connecting device, taken along line 3-3 of FIG. 2.

Referring to FIGS. 1-3, an air valve connecting device in accordance with the present invention comprises a head body or housing 10 including a chamber 11 formed therein, and an outer thread 12 formed in the one or first or lower end portion 13 thereof, and a peripheral flange 14 extended radially and inwardly into the chamber 11 of the housing 10 at the other or second or upper end portion 15 of the housing 10 for forming or defining an inner peripheral shoulder 16 in the second end portion 15 of the housing 10, and a cylindrical tube 17 laterally extended from the housing 10 and substantially perpendicular to the housing 10, and a bore 18 formed in the cylindrical tube 17 for coupling to an air pump (not illustrated) or a pressurized air reservoir or the like, and a passage 19 formed therein communicating with the chamber 11 of the housing 10 and the bore 18 of the cylindrical tube 17.

The housing 10 includes a cover 20 attached or secured to the first or lower end portion 13 thereof, for example, the cover 20 includes a space 21 and/or a screw hole or an inner thread 22 formed therein (FIG. 1) for threading or engaging with the outer thread 12 of the housing 10 and for detachably or releasably attaching or securing the cover 20 to the housing 10. Alternatively, the cover 20 may be molded and formed integral with the housing 10 and moved in concert with the housing 10. The cover 20 may further include a peripheral projection 23 extended radially and inwardly into the screw hole or space 21 of the cover 20, and also extended into the chamber 11 of the housing 10 (FIGS. 3-8); or the housing 10 includes the peripheral projection 23 directly extended radially and inwardly into the chamber 11 of the housing 10 at the first end portion 13 of the housing 10 (not shown).

An actuator or actuating or sliding member 30 is slidably engaged in the chamber 11 of the housing 10 and movable up and down relative to the housing 10 and contactable or engageable with the inner peripheral shoulder 16 and/or the peripheral flange 14 of the housing 10 (FIGS. 5, 8) for being confined and limited within the chamber 11 of the housing 10 to prevent the sliding member 30 from being disengaged or separated from the housing 10 through the second end portion 15 of the housing 10, and the peripheral projection 23 of the housing 10 or of the cover 20 may also be used to anchor or retain the sliding member 30 within the chamber 11 of the housing 10 to prevent the sliding member 30 from being disengaged or separated from the housing 10 through the first end portion 13 of the housing 10.

The sliding member 30 includes a key or peg 31 (FIG. 1) extended therefrom to be slidably engaged with a guide slot 24 of the housing 10 (FIG. 1) for guiding the sliding member 30 to slide longitudinally and/or up and down relative to the housing 10 and for preventing the sliding member 30 from being pivoted or rotated relative to the housing 10. The sliding member 30 further includes a bore or compartment 32 formed therein, and a peripheral bulge or swelling 33 extended radially and inwardly into the compartment 32 of the sliding member 30 for forming or defining a bore or space 34 in the sliding member 30 and communicating with the compartment 32 which has an inner diameter greater than that of the space 34 of the sliding member 30, and the sliding member 30 further includes an outer thread 35 formed in the lower portion thereof (FIG. 1) and an inner peripheral depression 36 formed in the upper portion of the sliding member 30.

The sliding member 30 further includes a peripheral passage or pathway 37 formed in the middle or intermediate portion thereof communicating with the space 34 and the compartment 32 of the sliding member 30, and/or a passage or manifold 38 also formed in the middle or intermediate portion thereof communicating with the peripheral pathway 37 and the space 34 and the compartment 32 of the sliding member 30, and the peripheral pathway 37 of the sliding member 30 may be selectively aligned or communicated with the passage 19 and the bore 18 of the cylindrical tube 17 (FIGS. 3, 4) for selectively receiving the pressurized air from the air reservoir or hand-held air pump (not illustrated) or the like, and for allowing the pressurized air from the bore 18 of the cylindrical tube 17 to selectively flow from the peripheral pathway 37 to the space 34 and the compartment 32 of the sliding member 30.

A gripping or grasping device 5 includes a ring or casing 50 having an inner thread 51 formed therein for threading or engaging with the outer thread 35 of the sliding member 30, and for allowing the casing 50 of the grasping device 5 to be slid or moved longitudinally and/or up and down relative to the housing 10 in concert with the sliding member 30. The casing 50 includes one or more spring blades or pawls 52 extended downwardly therefrom, each of the pawls 52 includes a peripheral protrusion or recess 53 formed in the outer and middle or intermediate portion thereof for engaging with the peripheral projection 23 of the cover 20 or of the housing 10 and for limiting the casing 50 to slide or move relative to the cover 20 or the housing 10 and for preventing the casing 50 of the grasping device 5 from being disengaged or separated from the cover 20 or the housing 10.

As shown in FIGS. 1 and 3-8, each of the pawls 52 includes a tilted or curved bottom or lower portion 54 located below the protrusions 53 and extendible out of the cover 20 and the first end portion 13 of the housing 10 (FIGS. 3, 4) for selectively contacting or engaging with the peripheral projection 23 of the cover 20 or of the housing 10, and/or the peripheral projection 23 of the housing 10 or of the cover 20 which may contact or engage with the tilted or curved lower portions 54 of the pawls 52 for selectively forcing the pawls 52 radially inward and toward each other and also for selectively squeezing or compressing a gasket 55 toward an inflation valve 90, and thus for resiliently clamping or grasping the inflation valve 90 to the sliding member 30 when the gasket 55 and the pawls 52 with the inflation valve 90 are forced or moved into the chamber 11 of the housing 10 (FIG. 5), such that the air valve connecting device in accordance with the present invention may be easily actuated or operated with a single hand of the user.

The cylindrical gasket 55 is made of soft or resilient materials, such as rubber, plastic, composite materials, or other synthetic materials for resiliently clamping or grasping the inflation valve 90, and engaged into and anchored or retained within the casing 50 and the pawls 52, such that the gasket 55 is moved in concert with the casing 50 and the sliding member 30, and the gasket 55 includes a bore 56 formed therein (FIGS. 1, 3-6) for selectively receiving or engaging with the inflation valve 90 (FIGS. 4, 5) for allowing the inflation valve 90 to be engaged through the bore 56 of the gasket 55. The peripheral projection 23 of the housing 10 or of the cover 20 may also be used to anchor or retain the gasket 55 within the casing 50 and the pawls 52. The inflation valve 90, 91 may be selected from a U.S. type valve 90 (FIGS. 3-5), a French type valve 91 (FIGS. 6-8), or the other inflation valves or the like.

Another sliding member or follower 60 is slidably received or engaged in the compartment 32 and/or the space 34 of the sliding member 30, and extendable or engageable into the bore 56 of the gasket 55 for selectively contacting or engaging with the inflation valves 90, 91 (FIGS. 3-8), and includes a stop or flap 61 laterally extended therefrom and contactable or engageable with the peripheral swelling 33 of the sliding member 30 which may guide and limit the follower 60 to slide or move relative to the sliding member 30 and arranged for allowing the follower 60 to be slid or moved in the compartment 32 of the sliding member 30. The follower 60 is arranged to be moved upwardly or engaged into the compartment 32 of the sliding member 30 with or by the inflation valve 91 (FIGS. 7, 8) selectively. One or more (such as two) marks or symbols 25, 26 are formed or provided on top of the housing 10 (FIG. 1).

An actuator or actuating button or knob 70 includes a peripheral flange or rib 71 extended radially and outwardly therefrom to be slidably or pivotally or rotatably engaged with the inner peripheral depression 36 of the sliding member 30 for allowing the actuating knob 70 to be pivoted or rotated relative to the sliding member 30, and to be moved up and down in concert with the sliding member 30 relative to the housing 10. The actuating knob 70 includes a cylinder or tubular member 72 extended downwardly therefrom, and includes a cavity 73 formed in the tubular member 72 and/or in the actuating knob 70, and includes one or more (such as two) slots or grooves 74 formed in the tubular member 72 for forming or defining one or more (such as two) actuating limbs or anchors 75, and includes a notch 76 formed in the upper portion thereof for selectively aligning with either of two marks or symbols 25, 26 of the housing 10 (FIGS. 1, 2) and arranged for allowing either of the symbols 25, 26 to be selectively seen through the notch 76 of the actuating knob 70 (FIG. 2).

Figure 4:
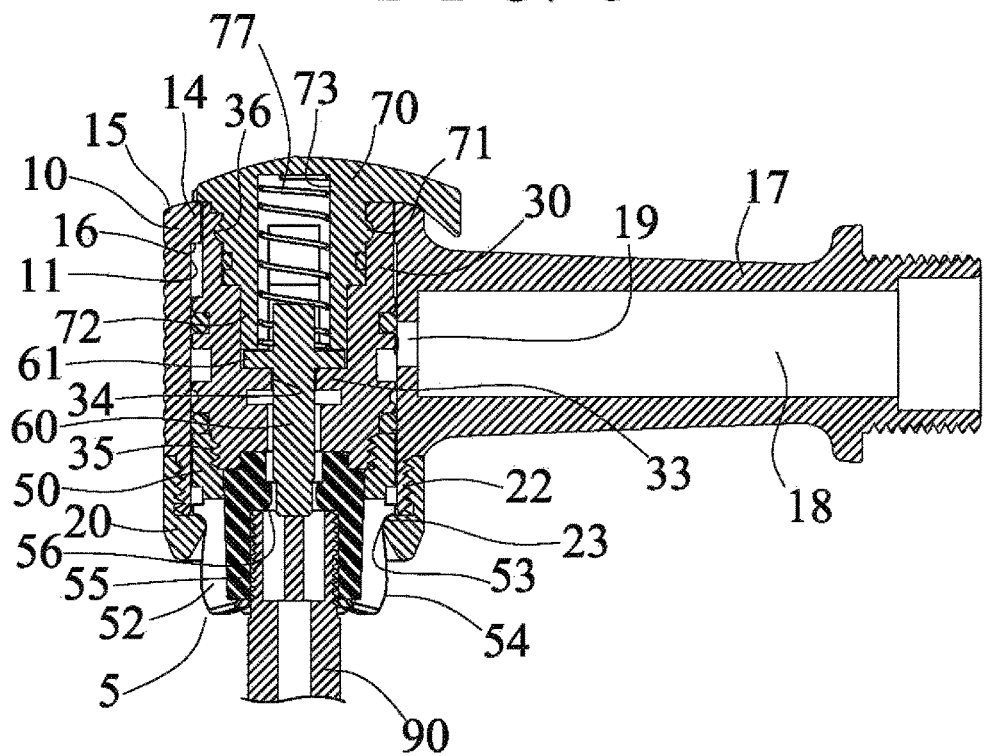
FIGS. 4, 5 are other cross sectional view similar to FIG. 3, illustrating the operation of the air valve connecting device for engaging with one of the inflation valves.
Figure 5:
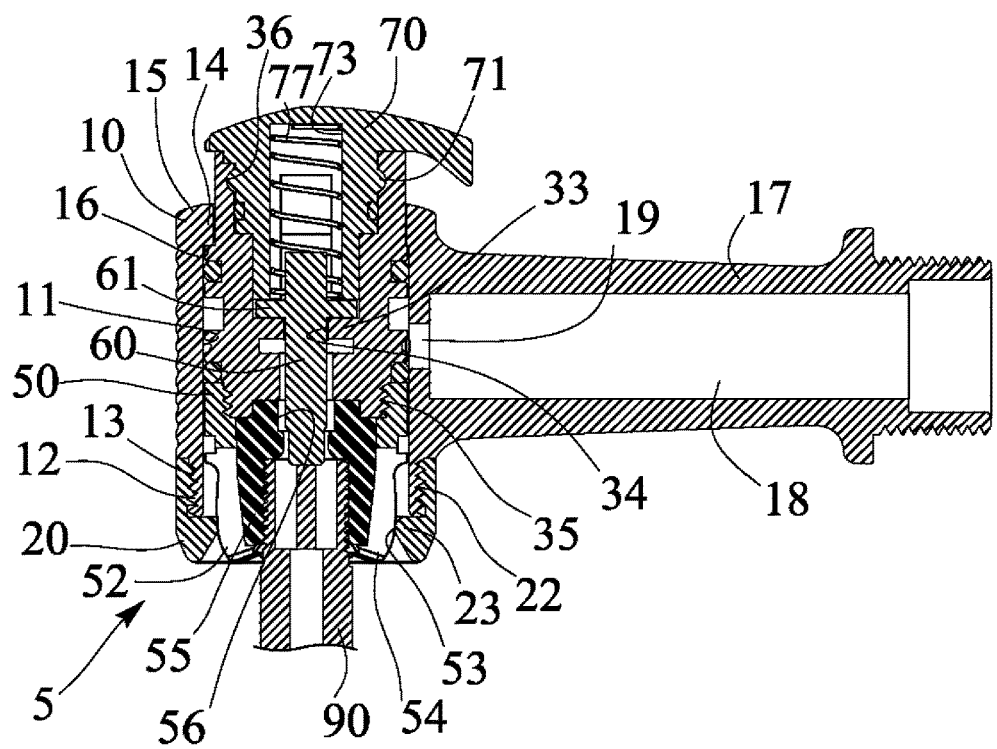
Figure 6:
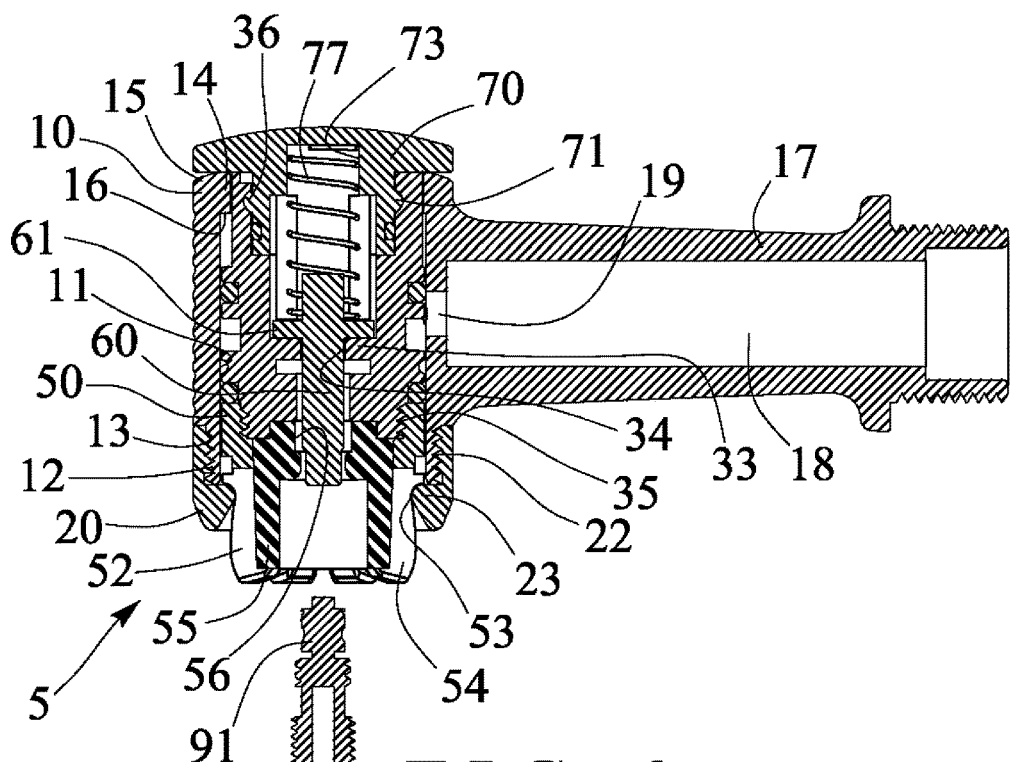
FIGS. 6, 7, 8 are cross sectional views similar to FIGS. 3-5, illustrating the operation of the air valve connecting device for engaging with the other inflation valve.
Figure 7:
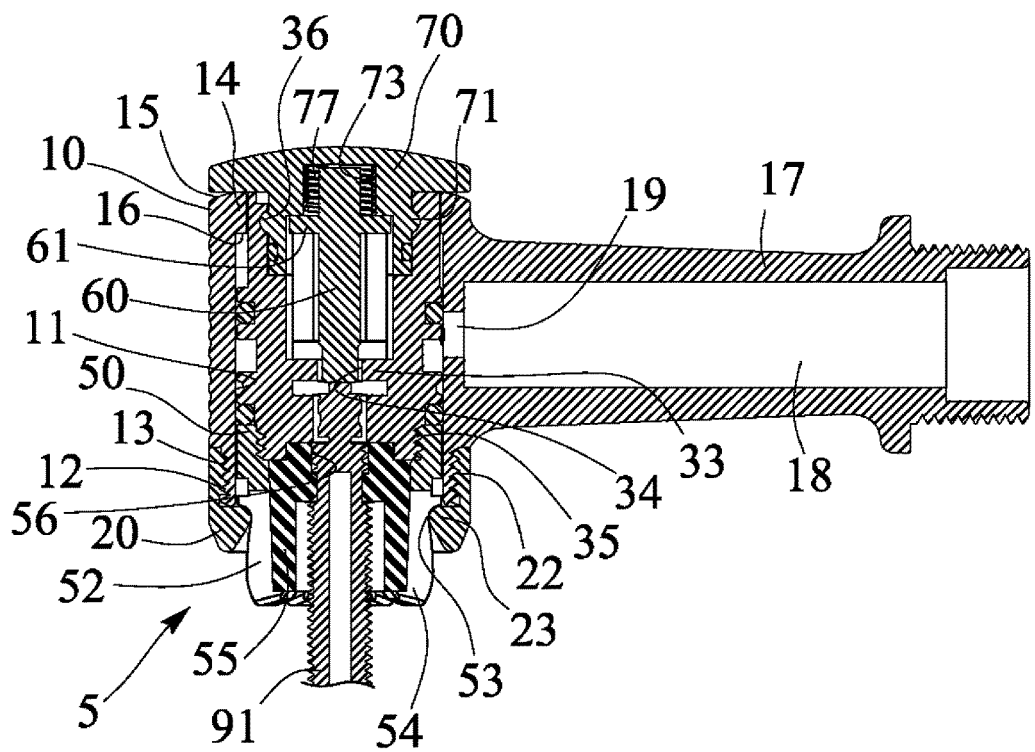
Figure 8:
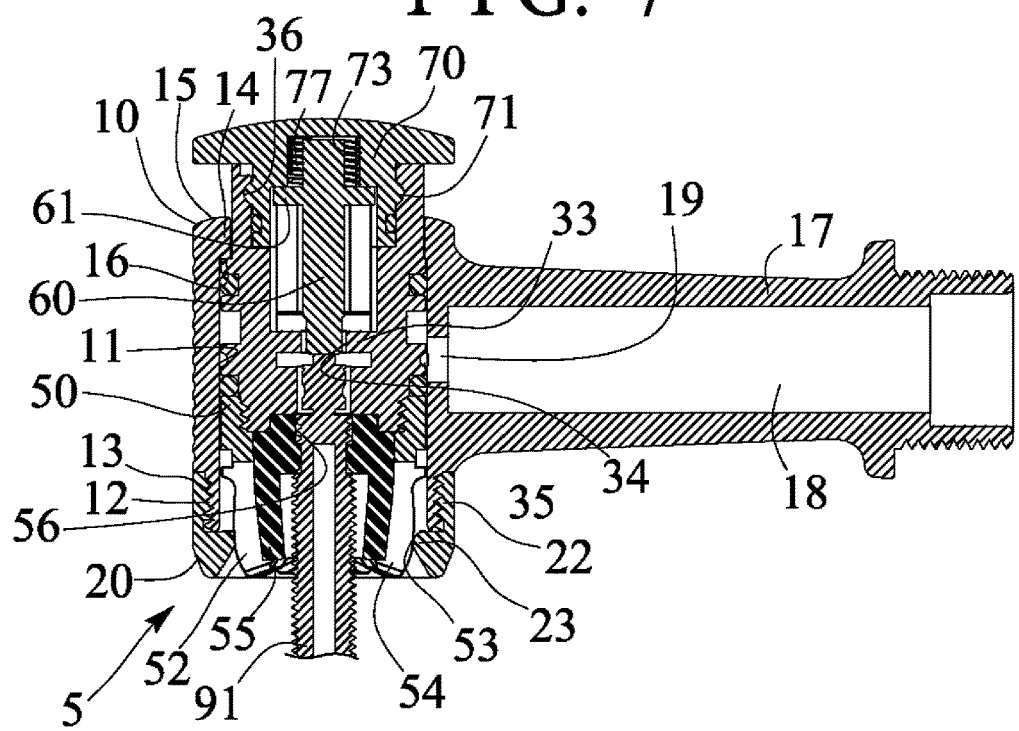

In operation, as shown in FIGS. 3-5, the anchors 75 of the tubular member 72 and/or of the actuating knob 70 may be selectively contacted or engaged with the flap 61 of the follower 60 in order to anchor or position the follower 60 to the sliding member 30; and as shown in FIGS. 6-8, when the actuating knob 70 is pivoted or rotated relative to the sliding member 30 for a predetermined or limited angle in order to align the grooves 74 of the actuating knob 70 with the flap 61 of the follower 60, the flap 61 of the follower 60 may slide and move up and down relative to the sliding member 30 and the actuating knob 70 and may thus be moved and engaged into the cavity 73 of the tubular member 72 and/or of the actuating knob 70. A spring biasing member 77 may further be provided and fitted or engaged into the cavity 73 of the tubular member 72 and/or of the actuating knob 70, and contacted or engaged with the follower 60 for selectively anchoring or retaining or positioning the follower 60 in engagement with the peripheral swelling 33 of the sliding member 30.

The notch 76 of the actuating knob 70 may be selectively aligned with one of the symbols 25 of the housing 10 (FIG. 2) when the anchors 75 of the tubular member 72 and/or of the actuating knob 70 are contacted or engaged with the flap 61 of the follower 60 (FIGS. 3-5), at this moment, the follower 60 may be contacted or engaged with the inflation valve 90, such as the U.S. type valve 90, when the inflation valve 90 is engaged into the bore 56 of the gasket 55; and may be selectively aligned with the other symbol 26 of the housing 10 when the grooves 74 of the actuating knob 70 are aligned with the flap 61 of the follower 60 (FIGS. 6-8), at this moment, the follower 60 may be forced to move into the cavity 73 of the tubular member 72 and/or of the actuating knob 70 with or by the other inflation valve 91 (FIGS. 7, 8), such as the French type valve 91.

In operation, as shown in FIGS. 2-5, when the notch 76 of the actuating knob 70 is aligned with one of the symbols 25 of the housing 10 and when the anchors 75 of the tubular member 72 and/or of the actuating knob 70 are contacted or engaged with the flap 61 of the follower 60 and when the actuating knob 70 is rotated relative to the housing 10 and the sliding member 30 to a first angular position, the follower 60 may be anchored or positioned to the sliding member 30 and may be contacted or engaged with the inflation valve 90, such as the U.S. type valve 90, when the inflation valve 90 is engaged into the bore 56 of the gasket 55. When the notch 76 of the actuating knob 70 is aligned with the other symbol 26 of the housing 10 and when the grooves 74 of the actuating knob 70 are aligned with the flap 61 of the follower 60 (FIGS. 6-8) and when the actuating knob 70 is rotated relative to the housing 10 and the sliding member 30 to a second angular position, the follower 60 may be released and may be forced to move into the cavity 73 of the tubular member 72 and/or of the actuating knob 70 with or by the other inflation valve 91, such as the French type valve 91, such that the air valve connecting device in accordance with the present invention may be easily and quickly engaged with either of the inflation valves 90, 91 by pivoting or rotating the actuating knob 70 relative to the sliding member 30 and the housing 10.

Accordingly, the air valve connecting device in accordance with the present invention includes a simplified structure for easily connecting to various inflation valves and for being easily actuated or operated with a single hand of the user and for being easily manufactured with a decreased manufacturing cost.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
   a housing, a sliding member, a gasket, a follower and an actuating knob;
   wherein said housing includes a chamber formed therein having a first end portion and a second end portion, said housing including a passage formed therein for communicating with said chamber of said housing;
   said sliding member being slidably engaged in said chamber of said housing and having a compartment and a pathway formed therein for communicating with said passage of said housing and for allowing an air from said passage and said chamber of said housing to flow from said pathway to said compartment of said sliding member;
   said gasket being attached to said sliding member having a bore formed therein for communicating with said compartment of said sliding member and for selectively engaging with an inflation valve;

said follower being slidably engaged in said compartment of said sliding member and engageable into said bore of said gasket for selectively engaging with said inflation valve; and said actuating knob being rotatably attached to said sliding member and rotatable relative to said housing and said sliding member to a first angular position where said follower is anchored to said sliding member and to a second angular position where said follower is released from said sliding member.

2. The air valve connecting device as claimed in claim 1, wherein said follower includes a flap extended therefrom, and said actuating knob includes at least one anchor extended therefrom for selectively engaging with said follower and for anchoring said follower to said sliding member, and said actuating knob includes at least one groove formed therein for selectively aligning with said follower and for allowing said follower to be moved along said at least one groove of said actuating knob.

3. The air valve connecting device as claimed in claim 2, wherein said actuating knob includes a tubular member extended therefrom, and includes a cavity formed in said tubular member, and said at least one groove is formed in said tubular member for forming said at least one anchor in said tubular member.

4. The air valve connecting device as claimed in claim 3, wherein said actuating knob includes a spring biasing member engaged in said tubular member and engaged with said follower.

5. The air valve connecting device as claimed in claim 1, wherein said housing includes two symbols provided on top thereof, and said actuating knob includes a notch formed therein for selectively aligning with either of said symbols of said housing and for allowing either of said symbols to be selectively seen through said notch of said actuating knob.

6. The air valve connecting device as claimed in claim 1, wherein said sliding member includes an inner peripheral depression formed therein, and said actuating knob includes a peripheral rib extended therefrom to be slidably engaged with said inner peripheral depression of said sliding member for allowing said actuating knob to be rotated relative to said sliding member.

7. The air valve connecting device as claimed in claim 1, wherein said housing includes a guide slot formed therein, and said sliding member includes a peg extended therefrom to be slidably engaged with said guide slot of said housing for guiding said sliding member to slide longitudinally relative to said housing and for preventing said sliding member from being rotated relative to said housing.

8. The air valve connecting device as claimed in claim 1, wherein said sliding member includes a peripheral swelling extended radially and inwardly into said compartment of said sliding member for forming a space with an inner diameter smaller than that of said compartment and communicating with said compartment in said sliding member.

9. The air valve connecting device as claimed in claim 1, wherein said air valve connecting device further comprises a grasping device having a plurality of pawls engaged with said gasket, each of said plurality of pawls includes a lower portion extendable out of said first end portion of said housing.

10. The air valve connecting device as claimed in claim 9, wherein said housing includes a cover attached to said first end portion of said housing, said cover includes a space formed therein and a peripheral projection extended radially and inwardly into said space of said cover, said peripheral projection of said cover is engageable with said plurality of pawls for selectively forcing said plurality of pawls radially inward and toward each other and for compressing said gasket to engage with said inflation valve.

* * * * *